United States Patent Office 3,332,906
Patented July 25, 1967

3,332,906
PROCESS FOR IMPROVING THE DYE AFFINITY OF POLYOLEFINS
Joseph Aboulafia, Bully-les-Mines, France, assignor to Ethylene-Plastique, Paris, France
No Drawing. Filed May 1, 1963, Ser. No. 277,116
Claims priority, application France, May 15, 1962, 897,536; Mar. 4, 1963, 926,663
3 Claims. (Cl. 260—41)

This invention relates to a process for improving the dye affinity of polyolefins.

Numerous methods for modifying polyolefins in this respect have been suggested, among which may be mentioned the various procedures summarized below:

(a) Surface oxidation by chemical or physical means, such as the action of oxidizing agents (for example, chromic acid and its salts or a permanganate), and irradiation; however, it is known that such oxidation modifies the mechanical properties of the polyolefin. (C. V. Stephenson, B. C. Moses and W. S. Wilcox, J. Polym. Sci., 55, 451–464 (1961) and T. H. Meltzer and R. H. Goldey, SPE Trans, 2 (1), 11–20 (1962).) The oxidation of polyethylene is furthermore assisted by salts of certain metals such as cobalt, cadmium and titanium (Renfrew, Polyethylene, p. 242 (1960)).

(b) The introduction of metal halides or oxyhalides into the polyolefin; this method prevents the use of the treated products in food technology and furthermore the products so obtained have the severe drawback of slowly evolving their halogen and thus causing corrosion phenomena as well as altering the color of the product.

(c) The introduction of a polyvalent metal, such as Ni, Cr, Co, Al, Ti or Zr, in the form of the free metal, the oxide, the hydroxide, or the salt of a mineral acid or of a carboxylic acid, these metals or compounds either being merely dispersed or soluble in the polyolefin. When these metals or compounds are used in the crystalline state they particularly interfere with the transparency of the polyolefin. In order to obtain the best possible distribution of the oxide, hydroxide or anhydride, attempts have been made either to dissolve these compounds together with the polymer in a common solvent and subsequently precipitating the mixture with a suitable precipitant, or to dissolve one member of the polymer/metal compound combination and to precipitate it in the presence of the other member. In all these methods the extra operations are difficult to take to completion and require the use of a solvent/precipitant combination. In the known methods in which a mineral or organic salt is incorporated into the polyolefin, the non-metallic part of the molecule remains within the polymer, thereby altering its mechanical properties and potentially giving rise to undesirable secondary corrosion phenomena.

In the known methods it is furthermore necessary to use more than 0.2% of the metal regardless of the form in which it is incorporated, in order to obtain a uniform distribution of the additive and hence the desired coloration on subsequent dyeing.

For example, the following differences in mechanical properties were observed with a given polyethylene of grade 7 melt index:

| Additive | Amount of aluminium introduced, percent by weight | Mechanical properties of the undyed polymer | | |
|---|---|---|---|---|
| | | Yield Pt.; kg./mm.² | Extensibility, percent | Breaking load, kg./mm.² |
| None | | 0.72 | 500 | 1.36 |
| Chromatographic Al₂O₃ (70 μ) | 0.5 | 0.85 | 480 | 1.20 |
| Al₂O₃ precipitated in butyl alcohol | 0.5 | 0.72 | 370 | 1.05 |
| Al Stearate | 0.25 | 0.75 | 360 | 1.18 |
| Do | 0.35 | 0.73 | 380 | 0.95 |

We have now developed an improved method of improving the dye affinity of polyolefins which enables the above-described disadvantages to be reduced or overcome and which comprises, according to the invention, incorporating in the polyolefin an organo-metallic compound which is soluble therein to obtain a uniform dispersion of the compound throughout the mass of polymer and then decomposing the compound to give a volatile organic residue which is easily removed and a metal oxide or hydroxide which remains in a finely divided and uniformly distributed state within the polymer.

The organo-metallic compound has the following formula:

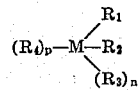

in which:

M is a metal selected from the group consisting of Ca, Mg, Zn, Al, Si, and B, and $R_1$, $R_2$, $R_3$, $R_4$ are identical or different groups constituted by alkyl or alkoxy radicals each containing 2 to 6 carbon atoms and whereof the bond with the metal atom is achieved by means of a carbon atom or an oxygen atom of these radicals, $n$ and $p$ being equal to 0 or 1 as a function of the valence of M.

Compared to known procedures this method possesses the advantage that the metallic residue of the decomposition of the organo-metallic compound used is present in an amorphous and uniformly distributed form throughout the mass of the polyolefin, which enables very uniform application of mordant dyes, of dispersion dyes and/or of printing inks to be obtained without the polyolefin exhibiting any change in its mechanical or other physical properties, particularly its transparency, after this coloring treatment.

The very active substrate which, by the method of the invention, is distributed uniformly in the macromolecular structure of the polyolefin can assume different roles depending upon the nature of the metal atom which it contains and depending upon both the physical and chemical properties of the oxide or hydroxide of which it consists. Thus, for example, the presence of barium or calcium oxide in a polyolefin gives it alkaline properties which enable it to adsorb and fix compounds containing free carboxylic groups or even atmospheric carbon dioxide.

The presence of magnesium, aluminium or calcium oxide in a polyolefin enables it to take up water and confers hydrophilic properties on the polymer. The presence of alumina in the polymer enables it to take up dyes either by chelation (mordant dyeing) or by adsorption. The presence of silica in a polyolefin enables it to adsorb organic molecules.

It will be apparent that in carrying out the method according to the invention only those oxides or hydroxides should be introduced into the polyolefin whose presence does not potentially cause the deterioration of the polymer, for example by reaction or by catalysis of secondary reactions. It is also preferred to exclude organo-metallic compounds which give rise to colored hydroxides which could confer undesirable colors on the polyolefins.

The quantity of oxide or hydroxide which should be introduced into the polyolefin depends on the role which it is intended to play.

If it is simply a case of dyeing the polymer, an amount of metal less than 2,000 p.p.m. may be used and the metal used may be aluminium, magnesium, calcium or boron. It is to be understood that a greater quantity of metal oxide or hydroxide than that corresponding to 2,000 p.p.m. may be introduced, for example quantities of the order of 2–3%, because the greater the amount of metal oxide or hydroxide in the polyolefin the greater the amount of dye retained and held by the treated polyolefin.

If it is required to confer on the polymer, which may optionally be dyed, hydrophilic properties which permit certain industrial applications such as printing, a quantity of metal of the order of 1–2% may be introduced into the polyolefin, the preferred oxides and hydroxides in such cases being those of magnesium, aluminium and silicon.

It is also possible, by the method of the present invention, to confer on polyolefin films the property of slowing down neutrons by introducing boron into the polyolefin in amounts of the order of 10% of this metal.

When introducing various organo-metallic compounds solely with a view to rendering the polyolefin more easily dyeable, the following are preferably used: (a) derivatives of calcium or magnesium in order to bind acidic dyes, such as Tartrazine or Eriofloxine, (b) derivatives of boron in order to bind basic dyes, such as those known as Victoria Blue and Rhodamine, (c) derivatives of aluminium in order to bind mordant dyes, such as Alizarin Red or Blue Black Eriochrome, and (d) derivatives of aluminium, calcium, or magnesium for dispersion dyes, such as "Blue Setacyl" P 4 G S (C I Disperse Blue 16) and "Orange Setacyl G" (C I Disperse Orange 12).

Where the weight of metal oxide to be introduced is greater than 1%, a supplementary treatment of the treated polyolefin is required in order to eliminate completely the organic residues formed by the decomposition of the organo-metallic compound, such as a metal alkyl or alkoxide, introduced. For this purpose the treated polyolefin is preferably left on heated rolls at a temperature above the softening point of the polymer for a period depending on the oxide or hydroxide content and ranging from several minutes to one hour.

If this precaution is not taken, the hydrocarbons or alcohols produced by the decomposition of the organo-metallic compounds remain trapped in the polyolefin in the form of bubbles which are only released when the material is given its final shape and at that stage cause faults therein.

Where the content of metal oxide or hydroxide is less than 1%, passing the treated polyolefin through a press equipped with an internal degassing device is generally sufficient to remove the small quantities of organic residues formed by the decomposition of the organo-metallic compound.

It may be noted that polyolefins obtained by the Ziegler or low pressure method contain, before washing, catalyst residues comprising a proportion of metal oxides, which lead to very similar results in dyeing as the method of the present invention; however, the presence of impurities other than alumina make it necessary to wash the polymer, which at one and the same time removes the undesirable titanium and halogenated compounds and the aluminium oxide, so that in order to render the polyolefins capable of being dyed it is still necessary to carry out the method according to the invention. In addition, the latter method enables quantities of metal oxides or hydroxides to be introduced into the polyolefin which are much greater than the content of catalyst residues, amounting to some tens of p.p.m., which results from low pressure polymerization.

Particularly suitable organo-metallic compounds are those which are not spontaneously inflammable and which may thus be injected into the separator of a high pressure reactor prior to extrusion; this leads to a great simplification of both process and equipment.

The following examples, in which all percentages are by weight unless otherwise indicated, are given by way of illustration only:

*Examples 1 to 5*

An organo-aluminium compound was injected continuously at 160° C. into the separator of a high pressure polyethylene reactor which was equipped with an extrusion screw, the rate of supply being such that the extruded polyethylene contained the desired amount of elementary aluminium. Operating in this manner, metal was uniformly dispersed throughout the polymer without significantly altering either its appearance or its physical properties. After extrusion, the polyethylene granules were colored and used for the production of moulded or blown articles which exhibited a beautiful transparent and uniform coloration throughout their mass. Articles were moulded from the colorless polyethylene and subsequently dyed to the desired shade. The dyes which were applied to the treated polyethylene were respectively dispersion dyes, mordant dyes, and acid wool dyes. In particular, the following were used: 2-hydroxybenzene azo-resorcinol, which gives a reddish brown lake; Rose Setacyl 3B; dry alizarin; and Salicyl Yellow.

It is to be noted that none of these dyes bonded to the untreated polyethylene.

The table below lists the mechanical properties of the same polyethylene which was treated as above described with a number of different organo-aluminium compounds:

| Example No. | Additive | Aluminium (percent) | Yield Pt., kg./mm.² | Maximum elongation, percent | Breaking load, kg./mm.² |
|---|---|---|---|---|---|
| | None | | 0.70 | 500 | 1.36 |
| 1 | t-Butoxy-diethyl-aluminium. | 0.25 | 0.80 | 470 | 1.36 |
| 1 bis | t-Butoxy-diethyl-aluminium polymer dyed with 2-hydroxy-benzene azo-(β-naphthol). | 0.25 | 0.80 | 450 | 1.35 |
| 2 | t-Butoxy-diethyl-aluminium. | 0.50 | 0.80 | 450 | 1.35 |
| 3 | t-Butoxy-diisobutyl aluminium. | 0.30 | 0.80 | 400 | 1.36 |
| 4 | t-Butoxy-diisobutyl aluminium. | 0.50 | 0.82 | 350 | 1.33 |
| 5 | Triiso-propoxy-aluminium | 0.25 | 0.80 | 440 | 1.40 |

Comparison of Examples 1 and 1 bis shows that the dyeing does not affect the mechanical characteristics of the treated polymer.

Example 2 compared to Example 1 shows that the mechanical properties are not affected by an excess of the additive; this observation is confirmed by comparison of Examples 3 and 4.

Examples 1 and 5 may be compared with the known methods described in the preamble of the present description and illustrated in the first table, more particularly with the known method in which the additive is aluminium stearate of which the organic portion remains bonded to the aluminium and is not eliminated from the polymer; it will be noted that the polymer treated according to the invention possesses greatly superior mechanical properties.

The following table contains results of experiments which show that the transparency of polyethylene films containing 0.25% aluminium, measured at two wavelengths, is improved by the treatment according to the invention as compared with previously known methods including those in which the aluminium was introduced as an organic compound. The value of the extinction coefficients at 600 mμ and at 800 mμ for a colorless 0.1 mm. thick polyethylene film of grade 3.5, containing different additives in quantities such that the aluminium content in all cases was 0.25%, is given:

| Additive | 600 mμ | 800 mμ |
|---|---|---|
| t-Butoxy-diisobutyl aluminium | 0.020 | 0.001 |
| t-Butoxy-diethyl aluminium | 0.042 | 0.008 |
| Triisopropoxy-aluminium | 0.040 | 0.017 |
| Aluminium stearate | 0.153 | 0.075 |

The values given above were determined 48 hours after production of the materials; checks showed that the values remain unchanged after 2 months. The dye reaction leading to the formation of lakes is very sensitive and may even be detected with aluminium contents of less than 50 p.p.m., using well known industrial mordant dyes such as Alizarin (C.I. 1027), Alizarin Orange S (C.I. 1033), Alizarin Blue S (C.I. 1066), Alizarin Bordeaux (C.I. 1045), Salicyl Yellow 2G (C.I. 36), Blue Black Eriochrome B (C.I. 201), Eriochrome Red B (C.I. 652), Naphthylamine Bordeaux (C.I. 82), α-nitroso-β-naphthol, Eriochrome Violet Brilliant R., and Eriochrome Brown DKL; this list is not intended to be exhaustive. Nevertheless, the most favorable aluminium content for this type of dye lies between 50 and 1000 p.p.m. of metal.

Dispersion dyes, better known in industry under the name of "acetate dyes," are, equally, exceptionally well fixed, particularly, Setacyl Blue P4GS (C.I. Disperse Blue 16), Setacyl Orange G (C.I. Disperse Orange 12) and Setacyl Rose 3 B (C.I. 60710 Disperse Red 15). In order to obtain good affinity for this group of dyes, the necessary content of aluminium is between 200 and 5000 p.p.m.; below the minimum concentration the shade is too light and appears as a pastel tint; on the other hand, the small further increase in shade does not justify an aluminium content above the maximum content quoted.

Checks have shown that the incorporation of additives according to the invention does not accelerate the ageing of polyethylene; the same is true for other polyolefins.

*Example 6*

5 kg. of polypropylene and 100 g. of diisobutylmono-tert.-butoxyaluminium were introduced into a mixer at 180° C.; a homogenous polymer having an aluminium content of 0.25% (2,500 p.p.m.) was obtained within a few minutes. The compound was soluble in polypropylene and did not change its appearance or mechanical properties. The polymer could be extruded in the molten state to form fibres and/or films which were subsequently dyed with mordant dyes or dispersion dyes. The dyed films and fibres retained their original transparency and the addition of the additive referred to did not accelerate the ageing of the polymer.

*Example 7*

A crystalline polyethylene (obtained by a low pressure polymerization process and carefully washed so as to contain less than 100 p.p.m. of ash consisting largely of titanium oxide) was mixed with 155 g. of triiso-propoxy-aluminium per 5 kg. of polyethylene by the procedure of Example 6 to produce a polymer containing 4,000 p.p.m. of aluminium. The molten polymer was extruded to form granules and the granules were dyed throughout their mass by dispersion dyes or mordant dyes. The granules could be converted to colored blown containers or uniformly colored mouldings which were very transparent and possessed unchanged mechanical properties.

The same result was obtained by mixing polyethylene powder with powdered triisobutoxy-aluminium and extruding this mixture directly.

*Example 8*

The polymer prepared by the method described in Example 6 was extruded into film or tubes and normal printing inks, finishing agents and adhesives adhered perfectly to the extruded products.

*Example 9*

250 g. of polybutene and 3 g. of triisobutyl-aluminium were introduced into a mixer heated to 150° C. and containing an inert atmosphere; after a few minutes the polymer mixture, which contained 1,000 p.p.m. of aluminium, was removed from the mixer; it had unchanged mechanical properties. This polymer could be dyed with dispersion dyes or with mordant dyes which form a chelate with the aluminium. It could also be surface printed using conventional printing techniques.

*Example 10*

10% of a polyethylene wax as defined by Renfrew and Morgan in Polyethylene (2nd edition, chapter 11) were added under an inert atmosphere to high pressure polyethylene of grade 1 (Melt Index 1) contained in a mixer, the polyethylene wax containing 5% of triethyl aluminium dissolved therein. After mixing, a polyethylene of grade 3.5 containing 1,000 p.p.m. of aluminium was obtained. This product could be extruded into sheaths, films, or other articles which could be dyed by the range of dyes previously indicated.

*Example 11*

1.7 g. of triethoxy-aluminium were incorporated into 1 kg. of an elastomeric copolymer of ethylene and propylene containing 35 mole percent of the latter, on hot rolls at 120° C., so that the final content of aluminium was 500 p.p.m. The product obtained could be equally well dyed by dispersion dyes or by dyes which chelate with the aluminum. The mechanical properties were unchanged by the treatment and dyeing.

*Example 12*

Following the method of H. Bartl and Peter (Kautschuk und Gummi, 14.W.T., 23–32 (1961)), a copolymer of ethylene and vinyl acetate containing 20 mole percent of vinyl acetate was prepared; 3.3 g. of t.-butoxy-diisobutyl aluminium was introduced into 260 g. of the copolymer as described in Example 11 so that the mixture contained 1,500 p.p.m. of aluminum. Dispersion dyes, mordant dyes and printing inks were effectively fixed by this mixture whether it was in the form of extruded, moulded or blown articles.

*Example 13*

250 g. of isotactic polystyrene and 8 g. of t.-butoxy diethyl aluminum were introduced into an internal mixer and after 4 minutes mixing at 180° C., a polystyrene cake containing 0.12% aluminium was removed. The polymer could be pressed into perfectly transparent sheets and could be dyed with the mordant dyes or dispersion dyes previously indicated. The mechanical properties of the polymer were not changed by the introduction of the additive and the tendency to ageing was not increased.

*Example 14*

Di-tert.-butoxy calcium was continuously injected at 160° C. into the separator of a high pressure polyethylene reactor at a rate such that the extruded polymer contained 1,500 p.p.m. of metallic calcium.

The organic calcium compound was perfectly dissolved in the polyethylene without modifying its appearance or mechanical properties.

Subsequently the granules obtained were directly wet-dyed using dispersion dyes (a deep Setacyl Green) or, alternatively, using acid dyes (Tartrazine and Polar Yellow). The dye took perfectly even though the same dyes do not fix to a normal untreated polyethylene.

*Example 15*

5 kg. of polypropylene and 150 g. isopropoxy-magnesium were introduced into a mixer at 180° C. After mixing for a few minutes, a homogeneous polymer containing 0.5% of metallic magneisum was obtained. The external appearance and mechanical properties of the polymer were of the same order as those of the untreated polymer.

The molten polymer so obtained was extruded through an extruder provided with an internal degassing device in order to produce granules from which fibres, films and moulded articles could be produced; these could be wet-dyed using dispersion dyes or acid dyes. Dyes of these groups have practically no affinity for articles of untreated polypropylene.

*Example 16*

25 g. of tetraethyl silicon were incorporated into 1 kg. of an elastomeric copolymer of ethylene and propylene containing 25 mole percent of propylene by mixing on rolls heated to 120° C.; the final content of elementary silicon in the polymer was 0.5%.

The treated polymer could be dyed with dispersion dyes and was furthermore easily wetted by water.

Its mechanical properties were substantially the same as those of an untreated polymer. The same results could be obtained by using tetraethyl silicate in place of tetraethyl silicon.

*Example 17*

A mixture of low pressure polyethylene powder and n-butyl borate, in proportions such that the final polymer contained 1,000 p.p.m. of elementary boron, was introduced continuously into the feed hopper of a press provided with an internal degassing device. The polymer so treated was easily wettable by water and could be dyed with basic dyes.

*Example 18*

10% of polyethylene wax containing 5% of di-n-propyl-zinc dissolved therein was introduced into a high pressure polyethylene of grade 1 in an internal mixer under an inert atmosphere. After mixing, a polyethylene of grade 3.5 containing 1,000 p.p.m. of zinc was obtained. This could be extruded into pellets, films or other articles which could be dyed with mordant dyes, dispersion dyes or acid wool dyes.

Printing inks adhered well to the treated polyethylene. The mechanical properties of this polyethylene were the same as those of an untreated polyethylene.

The following table gives the results of comparative experiments relating to the mechanical properties of polyolefins treated according to the invention. This table indicates the percentage elongation and the breaking load (in kg. per mm.$^2$) as a function of the metal introduced into the polyethylene, the nature of the organo-metallic compound and the percentage of anhydrous oxide introduced into the polyethylene.

| Organic Radical | Metal | Percent of anhydrous oxide | Percent elongation | Breaking load |
|---|---|---|---|---|
| Untreated polyethylene | | | 480 | 1.36 |
| Isopropoxy | Mg | 2 | 390 | 1.00 |
| Di-tert.-butoxy | Ca | 1.2 | 410 | 1.25 |
| Butyl borate | B | 0.6 | 425 | 1.02 |
| Isopropoxy | Al | 4 | 340 | 1.17 |
| Do | Al | 2 | 430 | 1.32 |
| Do | Al | 1 | 450 | 1.35 |
| Ethyl silicate | Si | 0.4 | 420 | 1.20 |

What is claimed is:

1. A method of improving the dye affinity of polyolefins which comprises dissolving, in the polyolefin in the molten state, an organo-metallic compound having the formula;

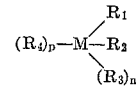

in which:

M is a metal selected from the group consisting of Ca, Mg, Zn, Al, Si, and B, and $R_1$, $R_2$, $R_3$, $R_4$ are identical or different groups constituted by alkyl or alkoxy radicals each containing 2 to 6 carbon atoms and wherein the bond with the metal atom is achieved by means of a carbon atom or an oxygen atom of these radicals, $n$ and $p$ being equal to 0 or 1 as a function of the valence of M; and thereafter decomposing the organo-metallic compound under the action of heat to form a metallic oxide or hydroxide which remains in a finely divided and uniformly distributed state within the polyolefin, the organo-metallic compound being incorporated in the polyolefin in a quantity to provide a metal oxide or hydroxide content in the polyolefin of between 0.2 and 3% by weight.

2. A method according to claim 1, wherein said organometallic compound is selected from the group consisting of tert.-butoxy-diethyl-aluminium, tert.-butoxydiisobutyl-aluminium, triisopropoxy-aluminium, tributoxy-aluminium, triisobutyl-aluminium, triethoxy-aluminium, di-tert.-butoxy-calcium, diisopropoxy-magnesium, tetraethyl-silicon, tetraethyl-silicate, n-butyl borate, di-n-propyl-zinc and triethyl-aluminium.

3. A method according to claim 1, wherein said organometallic compound is not spontaneously inflammable.

References Cited
UNITED STATES PATENTS
2,984,641  5/1961  Wolinski _____ 260—41

MORRIS LIEBMAN, *Primary Examiner.*

L. T. JACOBS, *Assistant Examiner.*